(12) United States Patent
Hobbs et al.

(10) Patent No.: US 10,054,259 B2
(45) Date of Patent: Aug. 21, 2018

(54) EXPANDING SOCKET ACCESSORY FOR MOBILE ELECTRONIC DEVICE

(71) Applicant: POPSOCKETS LLC, Boulder, CO (US)

(72) Inventors: Molly Hobbs, Boulder, CO (US); David B. Barnett, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 0 days.

(21) Appl. No.: 15/615,900

(22) Filed: Jun. 7, 2017

(65) Prior Publication Data
US 2018/0051851 A1     Feb. 22, 2018

Related U.S. Application Data

(60) Provisional application No. 62/376,237, filed on Aug. 17, 2016.

(51) Int. Cl.
*A47B 91/00* (2006.01)
*F16M 13/02* (2006.01)

(52) U.S. Cl.
CPC ..... *F16M 13/022* (2013.01); *F16M 2200/025* (2013.01)

(58) Field of Classification Search
CPC ................. F16M 13/022; F16M 2200/025
USPC ............. 248/346.3, 346.03, 346.04, 346.06, 248/346.11
See application file for complete search history.

(56) References Cited

U.S. PATENT DOCUMENTS

| | | | |
|---|---|---|---|
| 1,590,823 A | 6/1926 | Hewitt | |
| 2,876,979 A | 3/1959 | Barbera | |
| 2,880,902 A | 4/1959 | Owsen | |
| 3,425,595 A * | 2/1969 | Shapira | A47K 10/422 221/227 |
| 3,781,922 A * | 1/1974 | Ericson | A61B 10/007 4/144.1 |

(Continued)

FOREIGN PATENT DOCUMENTS

| CN | 101087317 A | 12/2007 |
|---|---|---|
| CN | 101090617 A | 12/2007 |

(Continued)

OTHER PUBLICATIONS

Petition for Inter Partes Review of U.S. Pat. No. 8,560,031, US Patent and Trademark Office, Before the Patent Trial and Appeal Board, *Quest USA Corp.* v. *PopSockets LLC*, Case No. IPR2018-00497, Jan. 15, 2018.

(Continued)

*Primary Examiner* — Gwendolyn W Baxter
(74) *Attorney, Agent, or Firm* — Marshall, Gerstein & Borun LLP

(57) ABSTRACT

An expandable socket for attachment to a mobile electronic device. The expandable socket includes a platform adapted to engage a portion of the portable media player, a skin coupled to the platform, wherein the skin is deformable between a collapsed configuration and an expanded configuration. The expandable socket includes a button coupled to the skin opposite the platform. The expandable socket also includes a biasing element arranged within the skin between the platform and the button, the biasing element configured to bias the skin into the expanded configuration.

30 Claims, 3 Drawing Sheets

(56) References Cited

U.S. PATENT DOCUMENTS

| | | | |
|---|---|---|---|
| 4,878,863 A | 11/1989 | Swengel, Jr. et al. | |
| 4,927,191 A | 5/1990 | Mikol | |
| 4,955,493 A | 9/1990 | Touzani | |
| 5,568,549 A | 10/1996 | Wang | |
| 5,807,144 A | 9/1998 | Sivard | |
| 6,196,850 B1 | 3/2001 | Dietz et al. | |
| D471,547 S | 3/2003 | Ruohonen | |
| 6,736,285 B2 | 5/2004 | Stewart-Stand | |
| 6,776,660 B1 | 8/2004 | Kubota et al. | |
| 6,781,522 B2 | 8/2004 | Sleva et al. | |
| D532,004 S | 11/2006 | Kettula et al. | |
| 7,324,156 B2 | 1/2008 | Lohr et al. | |
| D570,593 S | 6/2008 | Justiss | |
| 7,422,486 B2 | 9/2008 | Hoff et al. | |
| 7,540,788 B2 | 6/2009 | Murphy et al. | |
| 7,581,119 B2 | 8/2009 | Tupman et al. | |
| 7,644,895 B2 | 1/2010 | Tseng | |
| 7,678,271 B2 | 3/2010 | Curtin | |
| 7,782,610 B2 | 8/2010 | Diebel et al. | |
| 7,822,448 B2 | 10/2010 | Lin et al. | |
| 7,983,034 B1 | 7/2011 | Mohoney | |
| D647,085 S | 10/2011 | Chung et al. | |
| 8,078,224 B2 | 12/2011 | Fadell et al. | |
| 8,080,975 B2 | 12/2011 | Bessa et al. | |
| 8,186,642 B2 | 5/2012 | Weiss-Vons | |
| 8,317,046 B2 | 11/2012 | Vanderberg et al. | |
| 8,560,031 B2 * | 10/2013 | Barnett | F16M 11/10 455/575.8 |
| 8,737,066 B1 | 5/2014 | Block | |
| 8,844,098 B2 | 9/2014 | Karmatz | |
| 9,787,348 B2 | 10/2017 | Srour | |
| 2002/0069582 A1 | 6/2002 | Weder | |
| 2003/0214131 A1 | 11/2003 | Kanao | |
| 2005/0243522 A1 | 11/2005 | Nilsen et al. | |
| 2007/0010821 A1 | 1/2007 | Wilkinson et al. | |
| 2007/0093786 A1 | 4/2007 | Goldsmith et al. | |
| 2007/0164036 A1 | 7/2007 | Brandenburg | |
| 2007/0293288 A1 | 12/2007 | Lin et al. | |
| 2008/0053770 A1 | 3/2008 | Tynyk | |
| 2008/0090443 A1 | 4/2008 | Ackloo | |
| 2008/0123287 A1 | 5/2008 | Rossell et al. | |
| 2008/0146958 A1 | 6/2008 | Guillory et al. | |
| 2008/0183275 A1 | 7/2008 | Schmid et al. | |
| 2008/0221404 A1 | 9/2008 | Tso | |
| 2008/0268916 A1 * | 10/2008 | Lin | H04M 1/0214 455/573 |
| 2008/0273297 A1 | 11/2008 | Kumar | |
| 2009/0115367 A1 | 5/2009 | Kidakam | |
| 2009/0240297 A1 | 9/2009 | Shavit et al. | |
| 2010/0155550 A1 | 6/2010 | Weiss-Vons | |
| 2011/0015496 A1 | 1/2011 | Sherman et al. | |
| 2011/0036876 A1 | 2/2011 | Fathollahi | |
| 2011/0084081 A1 | 4/2011 | Chung et al. | |
| 2011/0117974 A1 | 5/2011 | Spitalnik et al. | |
| 2011/0252839 A1 | 10/2011 | Stevens | |
| 2011/0284547 A1 * | 11/2011 | McElligott | B65D 21/086 220/495.03 |
| 2011/0301439 A1 | 12/2011 | Albert et al. | |
| 2012/0042476 A1 | 2/2012 | Karmatz | |
| 2013/0126691 A1 * | 5/2013 | Miklas | B60N 3/102 248/311.2 |
| 2014/0317329 A1 | 10/2014 | Barnett et al. | |
| 2015/0077927 A1 | 3/2015 | Barnett et al. | |
| 2016/0209733 A1 | 7/2016 | Akai et al. | |
| 2017/0195000 A1 | 7/2017 | Srour | |

FOREIGN PATENT DOCUMENTS

| | | |
|---|---|---|
| DE | 202011105790 U1 | 12/2011 |
| GB | 2316263 A | 2/1998 |
| RU | 2059399 C1 | 5/1996 |

OTHER PUBLICATIONS

Exhibit 1004—Declaration of Dr. Glenn E. Vallee, Ph.D., P.E., to Petition for Inter Partes Review of U.S. Pat. No. 8,560,031, US Patent and Trademark Office, Before the Patent Trial and Appeal Board, *Quest USA Corp.* v. *PopSockets LLC*, Case No. IPR2018-00497, Jan. 15, 2018.

Exhibit 1011—Webster's Third New International Dictionary (2002), to Petition for Inter Partes Review of U.S. Pat. No. 8,560,031, US Patent and Trademark Office, Before the Patent Trial and Appeal Board, *Quest USA Corp.* v. *PopSockets LLC*, Case No. IPR2018-00497, Jan. 15, 2018.

Initial Determination and Recommended Determination in the Matter of Certain Collapsible Sockets for Mobile Electronic Devices and Components Thereof, Investigation No. 337-TA-1056 (U.S. International Trade Commission), Jan. 31, 2018.

* cited by examiner

EXPANDING SOCKET ACCESSORY FOR MOBILE ELECTRONIC DEVICE

RELATED APPLICATION

The priority benefit of U.S. Provisional Patent Application Ser. No. 62/376,237, filed Aug. 17, 2016, is claimed and the entire contents thereof are incorporated by reference herein.

FIELD OF THE INVENTION

The present invention relates to collapsible grips and stands for mobile electronic devices.

BRIEF DESCRIPTION OF DRAWINGS

FIG. 1b is a top view of a portion of the expanding socket accessory of FIG. 1a;

DETAILED DESCRIPTION

The present disclosure relates to expanding socket accessories for mobile electronic devices. Mobile electronic devices can include smartphones, tablet computers, electronic readers, digital media players, cameras, and other mobile electronic devices having a surface suitable for receiving an expanding socket accessory. The expanding accessories disclosed herein can be directly attached to a mobile electronic device or can be indirectly attached by attaching the accessory to a mobile electronic device case or other accessory that attaches to the mobile electronic device.

Figure 1A:
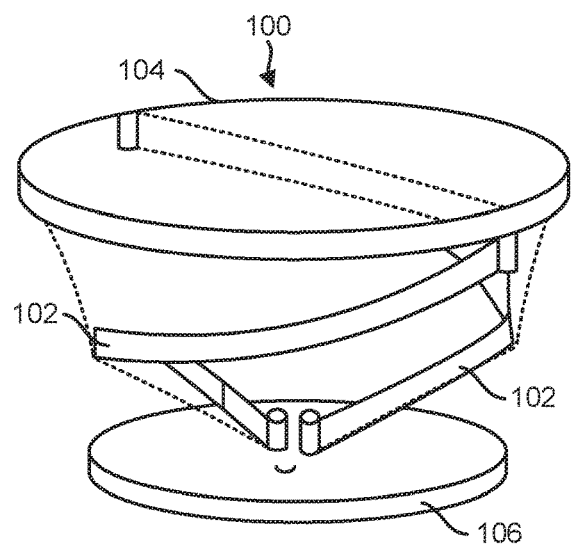
FIG. 1a is an isometric view of a portion of one example of an expanding socket accessory for a mobile electronic device, in the expanded position.

FIG. 1a is a side isometric cutaway view of expanded socket accessory 100 featuring a collapsing mechanism in the form of two thin-strip springs 102. Thin-strip springs 102 can also be referred to as strips or thin strips. In one embodiment, thin-strip springs 102 can be fabricated from spring steel or comparable metal. In another embodiment, thin-strip springs 102 can be produced from a stiff, flexible polymer. Other suitable materials can also be used. Each spring 102 can have one end mounted to the underside of button 104, which can be, for example, metal or plastic, and the other end of spring 102 can be mounted to the top side of the platform 106. Platform 106 can be attached to a mobile electronic device (not shown). Springs 102 can be formed such that they are bistable, with one of the stable states being the expanded state, as shown in FIG. 1a. To transition between stable states, a user of expanded socket accessory 100 can grasp button 104 and twist. Elastomer skin 212 (see FIG. 2) can surround and protect the strips for safety and comfort. Elastomer skin 212 can also be referred to as an accordion, a skin, an expanding and contracting cover, or a cover. Skin 212 is not shown in FIG. 1a, FIG. 1b or FIG. 1c for clarity.

Figure 1B:
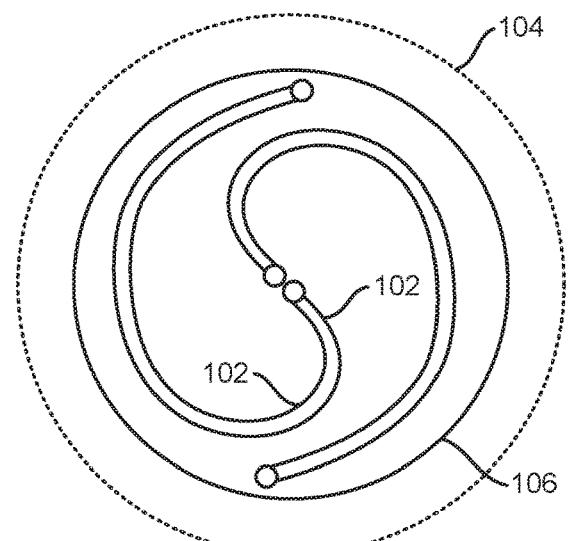

FIG. 1b is a top cutaway view of collapsed socket accessory 100 featuring the same collapsing mechanism 102 as shown in FIG. 1a. This collapsed state is the opposite end of the bistability from FIG. 1a. Note that strips 102 can be wrapped in the opposite direction from their path in the previous figure; again, the user can transition between the stable states by rotating the button 104, causing the strips 102 to alternate their direction of rotation.

Figure 1C:
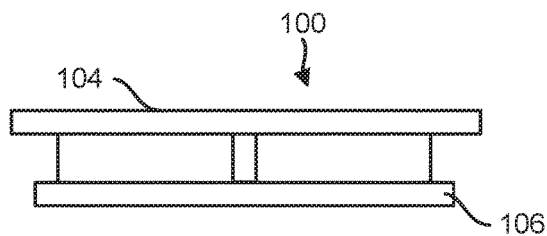
FIG. 1c is a side view of a portion of the expanding socket accessory of FIG. 1a, in the collapsed position.

FIG. 1c is a side section view of the collapsed socket accessory 100 of FIG. 1a and FIG. 1b.

Figure 2:
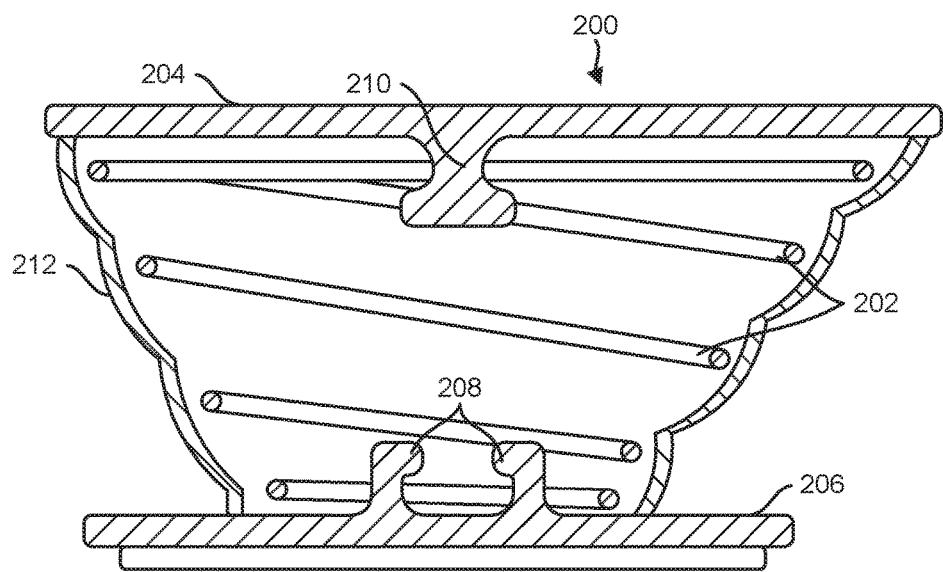
FIG. 2 is a sectional side view of an expanding socket accessory.

FIG. 2 is a side section view of another embodiment of an expanded socket accessory 200, featuring conical coil spring 202, that can be fabricated from, for example, metal or plastic, as the expansion mechanism. Locking protrusion 210 on button 204 interfaces with corresponding locking feature or projection 208 on platform 206, keeping socket accessory 200 collapsed when a user depresses button 204 towards platform 206. In this embodiment, button 204 can be, for example, metal or plastic. Platform 206 can be, for example, produced in plastic. Elastomer skin 212 surrounds and protects coil spring 202 for safety and comfort. Elastomer skin 212 can also be used to cover the embodiments of the other figures.

Figure 3A:
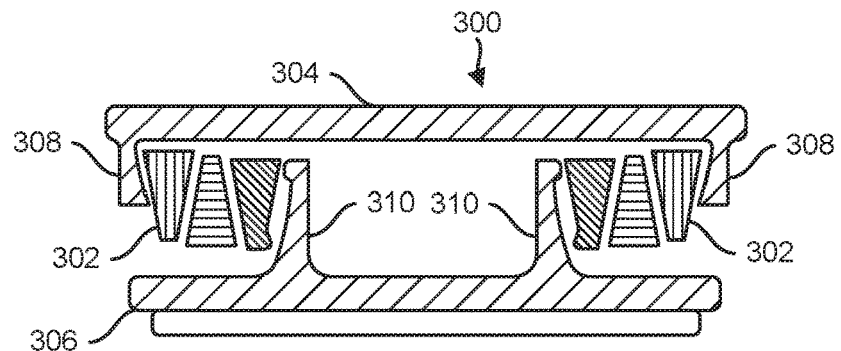
FIG. 3a is a sectional side view of another example of an expanding socket accessory, in a collapsed position.

FIG. 3a is a side section view of another embodiment of collapsed socket accessory 300 featuring concentric rings 302 with wedge-shaped cross-sections as the collapsing mechanism. Button 304 can feature taper 308 to keep the rings contained. Platform 306 can have detent 310 that can nest inside button taper 308 and concentric rings 302. To expand socket accessory 300, a user can pull up on button 304. In this embodiment, all features could be fabricated in, for example, metal or plastic.

Figure 3B:
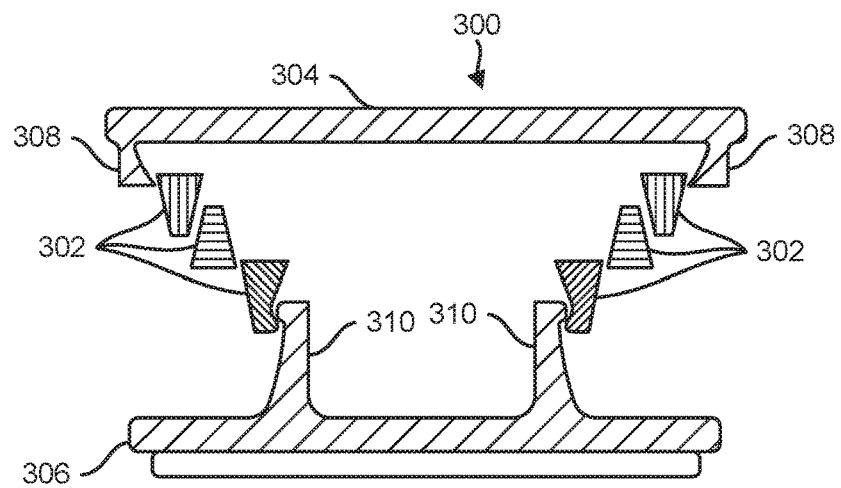
FIG. 3b is a sectional side view of the expanding socket accessory of FIG. 3a, in an expanded position.

FIG. 3b is a side section view of expanded socket accessory 300 featuring the collapsing mechanism described in FIG. 3a. Platform 306 can include detent-like feature 310 that can interface with the smallest ring of concentric rings 302 to lock mechanism into the expanded position. Rings 302 can utilize a friction-based taper lock between each ring to maintain the expanded position. To collapse socket accessory 300, a user can depress button 304 to disengage detent-like locking feature 310 and friction-based taper locks.

Figure 3C:
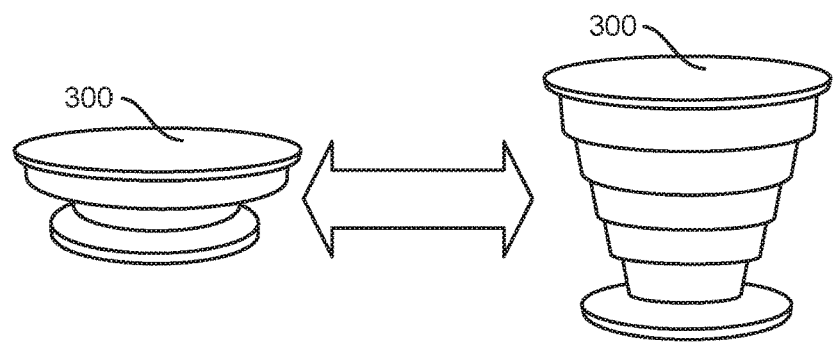
FIG. 3c is a side view of the expanding socket accessory of FIG. 3a, both in the collapsed position and in the expanded position.

FIG. 3c is a side isometric view of socket accessory 300 collapsed, and expanded.

The above description and description of figures may depict exemplary configurations for an embodiment of the disclosure, which is done to aid in understanding the features and functionality that can be included in the embodiments described herein. The embodiments are not restricted to the illustrated configurations, and can be implemented using a variety of alternative configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in claims hereafter, should not be limited by any of the above-described exemplary embodiments.

Terms and phrases used in this document, and variations thereof, unless otherwise expressly stated, should be construed as open-ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional", "traditional", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with conjunction "and" should not be read as requiring that each and every one of those items be present in the grouping, but rather should be read as "and/or" unless expressly stated otherwise. Furthermore, although item, elements, or components of the disclosure may be described or claimed in a singular, the plural is contemplated to be within the scope thereof unless limitation to the singular is explicitly stated. The presence of broadening words and phrases such as "one or more", "at least", "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The foregoing disclosure has been presented for purposes of illustration and description. Other modifications and variations may be possible in view of the above teachings. The embodiments described in the foregoing disclosure where chosen to explain the principles of the invention and its practical application to enable others skilled in the art to best utilize the invention. It is intended that any claims thereafter be construed to include other alternative embodiments of the invention except as limited by the prior art.

The invention claimed is:

1. An expandable socket for attachment to a portable media player or a portable media player case, the expandable socket comprising:
   a platform adapted to engage a portion of the portable media player or the portable media player case;
   a skin coupled to the platform, wherein the skin is deformable between a collapsed configuration and an expanded configuration such that when in the collapsed configuration a lock having a locking protrusion is securable within a resilient locking projection on the platform;
   a button coupled to the skin opposite the platform; and
   a biasing element arranged within the skin between the platform and the button, the biasing element configured to bias the skin into the expanded configuration.

2. The expandable socket of claim 1, wherein the skin comprises an elastomeric material.

3. The expandable socket of claim 1, wherein the skin comprises a tapered conical shape.

4. The expandable socket of claim 1, wherein the skin comprises at least one folding section.

5. The expandable socket of claim 4, wherein the skin comprises a plurality of folding sections.

6. The expandable socket of claim 4, wherein the at least one folding section has an accordion shape.

7. The expandable socket of claim 1, wherein the biasing element comprises a coil spring.

8. The expandable socket of claim 7, wherein the coil spring comprises a conical coil spring.

9. The expandable socket of claim 1, further comprising the lock configured to releasably secure the skin in the collapsed configuration.

10. The expandable socket of claim 9, wherein the lock comprises the locking protrusion carried by the button and arranged to engage the locking projection carried by the platform when the lock releasably secures the skin in the collapsed position.

11. The expandable socket of claim 9, wherein the locking projection further comprises a recess integral with the platform, and the protrusion defined by the button, the recess configured to receive the protrusion when the lock releasably secures the skin in the collapsed position.

12. An expandable socket for attachment to a portable media player or a portable media player case, the expandable socket comprising:
   a platform adapted to engage a portion of the portable media player or the portable media player case;
   a button that is spaced from and movable relative to the platform;
   a biasing element disposed between the platform and the button, the biasing element arranged to bias the button away from the platform;
   a skin surrounds the biasing element; and
   a lock configured to releasably secure the button to the platform, wherein the lock comprises a locking projection and a protrusion for releasably securing a collapsed configuration of the socket.

13. The expandable socket of claim 12, further comprising the skin arranged between the platform and the button, wherein the skin surrounds the biasing element.

14. The expandable socket of claim 13, wherein the skin comprises an elastomeric material.

15. The expandable socket of claim 14, wherein the skin comprises at least one folding section.

16. The expandable socket of claim 12, wherein the biasing element comprises a coil spring.

17. The expandable socket of claim 16, wherein the coil spring comprises a conical coil spring.

18. The expandable socket of claim 12, wherein the lock comprises the protrusion carried by the button and arranged to engage the locking projection carried by the platform when the lock releasably secures the button to the platform.

19. The expandable socket of claim 12, wherein the locking projection comprises a recess defined by the platform, the recess configured to receive the protrusion when the lock releasably secures the button to the platform.

20. An expandable socket for attachment to a portable media player or a portable media player case, the expandable socket comprising:
   a platform adapted to engage a portion of the portable media player or the portable media player case;
   a button that is spaced from and movable relative to the platform;
   a biasing element disposed between the platform and the button, the biasing element arranged to bias the button away from the platform; and a skin arranged between the platform and the button, wherein the button includes a protrusion releasably engagable to a locking projection defined by the platform.

21. The expandable socket of claim 20, further comprising the skin arranged between the platform and the button, wherein the skin surrounds the biasing element.

22. The expandable socket of claim 21, wherein the skin comprises an elastomeric material.

23. The expandable socket of claim 22, wherein the skin comprises at least one folding section.

24. The expandable socket of claim 20, wherein the biasing element comprises a coil spring.

25. The expandable socket of claim 24, wherein the coil spring comprises a conical coil spring.

26. The expandable socket of claim 20, further comprising the protrusion carried by the button and arranged to selectively engage the locking projection carried by the platform to releasably secure the button to the platform.

27. The expandable socket of claim 20, wherein, the locking projection further comprising a recess defined by the platform, the recess configured to selectively receive the protrusion to releasably secure the button to the platform.

28. An expandable socket for attachment to a portable media player or a portable media player case, the expandable socket comprising:
 a platform adapted to engage a portion of the portable media player or the portable media player case;
 an elastomeric skin coupled to the platform and having a hollow shape, the skin including at least one folded section and being deformable between a collapsed configuration and an expanded configuration;
 a button coupled to the skin opposite the platform, the button being disposed a first distance from the platform when the skin occupies the collapsed configuration and a second distance greater than the first distance from the platform when the skin occupies the expanded configuration;
 a spring arranged within the skin between the platform and the button, the spring biasing the button away from the platform to urge the skin into the expanded configuration; and
 a lock for selectively coupling the button to the platform such that the skin occupies the collapsed configuration when the button and platform are coupled such that the button includes a protrusion securable to a locking projection fixed to the platform.

29. The expandable socket of claim 28, wherein the lock comprises the protrusion carried by the button and arranged to engage the locking projection carried by the platform when the lock releasably couples the button to the platform.

30. The expandable socket of claim 28, wherein the locking projection further comprises a recess defined by the platform a, the recess configured to receive the protrusion when the lock couples the button to the platform.

* * * * *